April 30, 1968     G. ABRAHAM     3,381,147
MEASURING DEVICE EMPLOYING NEGATIVE RESISTANCE
Filed June 2, 1964     2 Sheets-Sheet 1

INVENTOR
GEORGE ABRAHAM

BY

ATTORNEY

INVENTOR

*GEORGE ABRAHAM*

BY

ATTORNEY

United States Patent Office 3,381,147
Patented Apr. 30, 1968

3,381,147
MEASURING DEVICE EMPLOYING
NEGATIVE RESISTANCE
George Abraham, 3167 Westover Drive SE.,
Washington, D.C. 20020
Filed June 2, 1964, Ser. No. 372,129
16 Claims. (Cl. 307—311)

The invention described herein may be manufactured and used by or for the Government of the United States of America for governmental purposes without the payment of any royalties thereon or therefor.

The present invention relates to measuring devices and more particularly to measuring devices employing negative resistance.

Instruments for measuring physical properties such as light, temperature, radiation and pressure, require for various applications specific limits on accuracy and calibration. In one application, "yes," "no" and "maybe" type accuracy is sufficient, while another situation may require measurements to be accurate within a tolerance of one ten-thousandth. Because of these varied specifications, many such instruments are accordingly limited in use. Measuring devices having adjustable accuracy and calibration controls, therefore, have been developed. These instruments, however, have provided this flexibility only at the expense of size, cost and complexity.

Accordingly, it is an object of the present invention to provide a measuring device of selected accuracy and calibration that is of simple construction, small size and low cost.

Another object of the present invention is to provide a measuring device utilizing negative resistance elements to obtain selective accuracy of measurement, calibration of readout, and having a memory.

Another object of the present invention is to provide a photodensitometer having selective accuracy of measurement, calibrated readout and measurement memory that is of simple construction, small size and low cost.

Briefly, the present invention comprises a plurality of semiconductor devices electrically associated with a sensor means, such as a photodiode, which, in response to a particular external stimulus to be measured, changes in resistance and triggers a number of the negative resistance devices into a state of high voltage conduction, the number triggered being proportional to the intensity of the external stimulus. Calibration is controlled by changing the voltage-current characteristic of the individual negative resistance elements. The accuracy of this measuring device is regulated by varying the number of negative resistance elements.

Other objects and advantages of the invention will become more fully apparent and better understood upon the consideration of the following description of the invention as illustrated in the accompanying drawings, in which.

Figure 1:
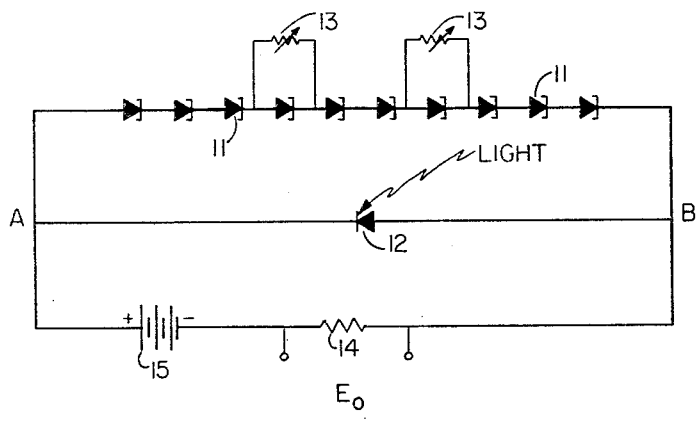
FIG. 1 is a circuit diagram of the preferred embodiment of the light measuring device of the present invention.

Referring now to the drawings, wherein like reference characters designate like parts throughout, there is shown in FIG. 1 a sensor means 12 which can be a photosensitive device such as a photodiode, as shown, or a photo transistor or other resistance-varying element such as a thermocouple, or strain gauge, whose resistance changes in response to a particular physical property. Photodiode 12 is connected across a plurality of voltage-controlled negative resistance elements, e.g. tunnel diodes 11, forming a series loop therewith. The number of tunnel diodes employed is determined by the degree of accuracy required and/or by the radix desired. These considerations are treated below. Shunting both the plurality of tunnel diodes and the photodiode is bias source 15, the polarity of which is such so as to forward-bias the tunnel diodes and reverse-bias the photodiode. Connected in series with bias source 15 is an output indicating means or load resistor 14, across which appears an output voltage $E_o$, which is correlative to the intensity of the property to be measured. It should be noted that output indications may readily be realized across individual tunnel diodes, the plurality of these negative resistance elements as a whole, or various combinations of tunnel diodes as desired. A variable resistor, indicated as 13, is connected across each individual tunnel diode to control the voltage-current characteristic thereof, thereby regulating the nonlinearity of the circuit.

Figure 2:
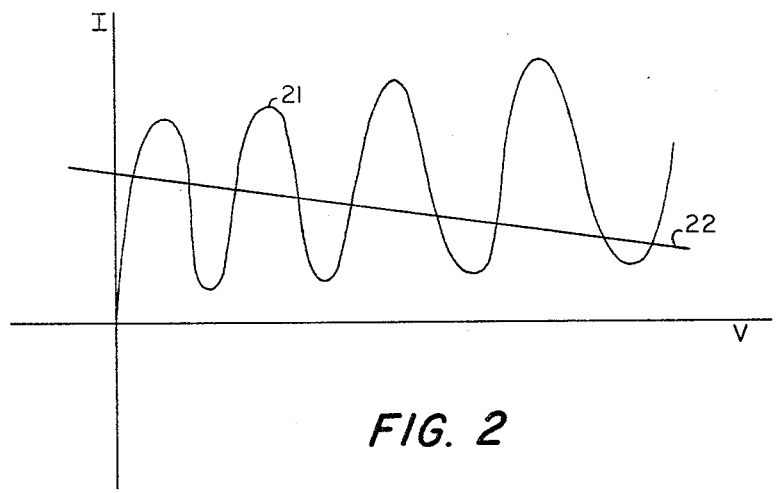
FIG. 2 illustrates the operating characteristic of the embodiment of FIG. 1.
Figure 3:
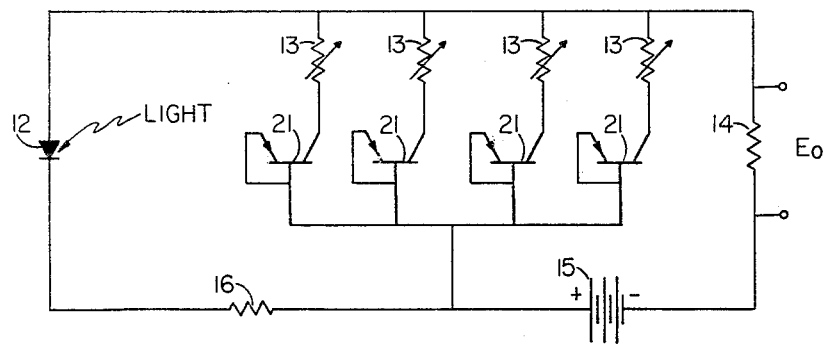
FIG. 3 is a circuit diagram of another embodiment of the present invention.
Figure 4:
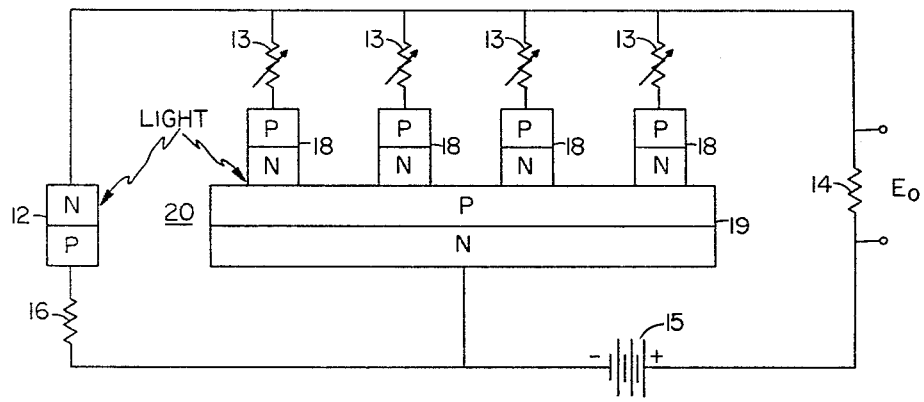
FIG. 4 shows, in partially schematic and block diagram form, still another embodiment of the present invention.

FIG. 2 is a representation of the characteristic of operation of the circuit shown in FIG. 1. The characteristic curve of the circuits shown in FIGS. 3 and 4 is substantially that shown in FIG. 2 except that a composite of N-type or current-controlled negative resistance characteristics would result from these parallel-connected circuits. In all other respects the operation is the same as for the embodiment of FIG. 1 described. Curve 21 is a composite of S-type or voltage-controlled negative resistance characteristics. Line 22, transecting curve 21, is the load line, representing the load to the tunnel diodes across points A and B of FIG. 1. As light impinges on photodiode 12, its resistance decreases, thereby increasing the load across the tunnel diodes. The effect of this load change can be seen in FIG. 2. Lowering the resistance of photodiode 12 is witnessed by an increase of the current through this device and the lowering of the voltage drop across it, thereby increasing the slope of load line 22 so that this line no longer transects the curve of the first tunnel diode causing this negative resistance element to conduct in its high voltage state, shown as the point at which load line 22 crosses the portion of the curve caused by the second tunnel diode. The number of tunnel diodes conducting at any one time in the high voltage state, therefore, is proportional to the intensity of the light or other physical property to be measured. Accordingly, since a voltage divider is formed by the composite of negative resistance devices and load resistor 14, the greater the intensity of the light or other property measured, the greater will be the number of tunnel diodes switched to a state of high voltage conduction, representing a greater portion of the voltage available from source 15 to be used by this negative resistance composite, thereby allowing less voltage to be realized across load resistor 14. The voltage output of the circuit, therefore, if taken across the load resistor is inversely proportional to light intensity, but provides a direct indication of the density of a film to be measured by passing light through it. A direct voltage indication of the light intensity, however, can be had by taking the output voltage across the negative resistance composite.

The effect of a variable resistor 13 shunting a tunnel diode may also be seen with reference to the composite characteristic shown in FIG. 2. This resistor is a means for controlling the voltage-current characteristic of each tunnel diode. As this resistance is lowered the peak current of the shunted tunnel diode increases, as does the valley current, while the peak voltage remains essentially constant and the valley voltage decreases. The effect of these changes is to vary the spacing between the positive resistance stable states of each element. The practical limits to this control is the requirement of bistability with the load of the circuit as a whole. By this means the linearity and nonlinearity of the response of the measuring device of the present invention may be controlled.

FIGS. 3 and 4 illustrate alternative embodiments to the circuit shown in FIG. 1. Shown in FIG. 3 is a plurality of transistors 21 having the emitters thereof directly connected to the respective base leads, which base leads form a common connection. Although shown as the preferred arrangement, this direct connection is not necessary and, if desired, could be replaced by a separate battery and variable resistor or variable bias source to form the connection, thereby providing a further degree of control over the triggering potential of the transistors and thus the calibration of the circuit by varying the rate of emitter injection. The direct emitter-base connection shown in this figure, however, provides optimum characteristics as well as practical operation. Bias source 15, shunting both transistors 21 and photodiode 12, here again performs a dual function. Connected across the collector-base junctions of the plurality of transistors 21, this source provides a reverse-bias across these junctions as well as reverse-biasing the light sensitive diode 12. The resistors 13, here connected in series with each of the negative resistance devices, again provide control over the voltage-current characteristic of the individual negative resistance devices. Resistor 16, in series connection with photodiode 12, is optional and serves to limit the current through this sensor. This photodiode is connected in parallel with the negative resistance devices 21 and the shunting bias source-load resistor 14 combination. The output-indicating device, shown as a load resistor 14, develops an output voltage $E_o$ thereacross proportional to the number of negative resistance transistors responding to the light caused to impinge on the photodiode.

It should be noted that in the FIG. 3 circuit, as well as the circuit of FIG. 4, the use of an external sensing element is unnecessary where light is the property to be detected. The emitter-base junction of one of the transistors in FIG. 3 or one of the junctions of the avalanche diodes in FIG. 4, could as readily be utilized as the sensing element. This alternative is illustrated by the two rays of light shown in FIG. 4.

FIG. 4 shows an integrated negative resistance semiconductor device 20 caused to operate in the avalanche breakdown region by bias source 15. While not shown, a network of parallel-connected avalanche diodes could readily be used in place of the integrated circuit in this figure. As shown, the two junction transistor of FIG. 3 is here replaced by a three junction avalanche diode as the basic negative resistance element. The integrated semiconductor device 20 comprises a plurality of PNPN avalanche diodes each having first P and N regions 18 physically separate from the composite device, and second P and N regions 19 common to all of the diodes. Except for the particular negative resistance device here described the circuit of this figure is identical in operation and description to that given above for the circuit of FIG. 3.

While the integrated negative resistance device of the embodiment illustrated in FIG. 4 has advantages in fabrication, compactness and reliability, the embodiment of FIG. 1 is preferred for use in certain environments. The highly doped tunnel diode, being a majority carrier device is relatively insensitive to nuclear radiation, obviating the need for shielding or other protection of the quantizer or converter portion of the circuit. In addition, the tunnel diode provides high speed operation and ready fabrication into the smallest of packages.

The memory function of the present invention is inherent in the operation of the embodiments heretofore described. In use as a photodensitometer, the advantage of this property can be readily illustrated. When the density or opaqueness of a film, such as an X-ray film, for example, is to be measured, it is placed between the photodiode and the source of light. The amount of light passing through the film will be registered by those negative resistance devices whose states of conduction have changed in accordance with the light transmitted to the photo detector. When the film is removed, these negative resistance devices will remain in their altered state of conduction, storing the indication of light intensity, or film density, to subsequently be read out by any output indicating device desired. Those negative resistance devices caused to be set by the sample tested can be reset by either exposing the photodiode to a source of light of greater intensity than can be registered by the number of negative resistance elements provided, which will cause an external trigger to reset the circuit, subjecting the negative resistance elements to a negative pulse or by removing the source of bias voltage 15. Prior to reset, the "remembered" reading of the X-ray film is available for recording or for any information comparisons desired.

In addition to the measurement of light, other physical properties can be measured by the present invention, with a suitable transducer, detector or sensor being utilized. So long as the sensor is capable of converting the information sensed into a proportional electrical representation, the advantages of small size, low cost, variably adjusted accuracy and linearity of measurement with memory are available.

It should again be pointed out that the accuracy of the measurement of the present invention within a preselected radix is merely dependent upon the number of negative resistance elements used. With a base-10 or decimal readout, for example, the accuracy of the measurement can be readily enhanced by a factor of 10 by providing 100 negative resistance devices instead of the 10 required.

Linearity of measurement is also controllable, mainly by the resistors 13 illustrated in the drawings, but also by changing the biasing of the negative resistance devices, assuming identical negative resistance devices, or by selecting or controlling the doping of the devices themselves. The spacing between stable states may be equispaced, as indicated above. On the other hand, by varying resistors 13, the states may be spaced asymetrically to produce a binary output, for example, or if logarithmic or square law readings are desired instead of a linear output. Conversely, if the output of the sensing means is nonlinear, the spacing between the table states of the negative resistance circuit may be adjusted to provide a linear electrical output.

Since various changes and modifications may be made in the practice of the invention herein described without departing from spirit or scope thereof, it is intended that the foregoing description shall be taken primarily by way of illustration and not in limitation except as may be required by the appended claims.

What is claimed and desired to be secured by Letters Patent of the United States is:

1. A light measuring device comprising:
    a plurality of negative resistance semiconductor devices connected in series;
    light sensitive means connected across the serially connected plurality of negative resistance devices;
    output indicating means;
    and bias means forming a series loop with said negative resistance devices and said output indicating means, said bias means being poled so that said negative resistance devices are forward biased and said light sensitive means is reverse-biased,
    whereby a number of said negative resistance devices are caused to change their state of conduction in proportion to the intensity of the light received by said light sensitive means.

2. A light measuring device as recited in claim 1, wherein said negative resistance devices are substantially light insensitive.

3. A light measuring device as recited in claim 1, wherein said negative resistance devices are tunnel diodes.

4. A light measuring device as recited in claim 3, wherein said plurality of tunnel diodes number ten, and the voltage developed across said output indicating means provides a decimal indication of the intensity of the light received by said light sensitive means.

5. A light measuring device as recited in claim 3, wherein each tunnel diode is shunted by a variable resistor to control the individual voltage-current characteristics.

6. A light measuring device as recited in claim 5, wherein each variable resistor is adjusted to provide a desired nonlinear response for said light measuring device.

7. A light measuring device as recited in claim 5, wherein each variable resistor is adjusted to provide a binary response for said light measuring device.

8. A measuring device comprising:
multijunction negative resistance semiconductor means;
sensor means;
bias means;
said sensor means and said bias means being respectively connected in parallel across said multijunction negative resistance semiconductor means,
such that said multijunction negative resistance means is forward-biased and said sensor means is reverse-biased,
whereby the resistance of said sensor means is caused to change upon exposure to an external stimulus causing a number of semiconductors of said multijunction negative resistance means to change their states of conduction;
and output-indicating means connected to provide an output voltage thereacross correlative to the change in states of conduction of said multijunction negative resistance means.

9. A measuring device as recited in claim 8, wherein said sensor means is a thermocouple and said external stimulus is temperature.

10. A measuring device as recited in claim 8, wherein said sensor means is photosensitive and said external stimulus is light.

11. A measuring device as recited in claim 8, wherein said sensor means is pressure sensitive and said external stimulus is pressure.

12. A measuring device as recited in claim 8, wherein said multijunction negative resistance semiconductor means is substantially light insensitive.

13. A measuring device as recited in claim 8, wherein said multijunction negative resistance semiconductor means is a series of tunnel diodes.

14. A measuring device as recited in claim 8, wherein said multijunction negative resistance semiconductor means is a plurality of PNPN avalanche diodes, each connected in parallel with each other.

15. A measuring device as recited in claim 8, wherein said multijunction negative resistance means is a plurality of PNPN avalanche diodes, each connected in parallel with each other, and said sensor means is defined by the light sensitive region near the NP junction of one of said PNPN avalanche diodes.

16. A measuring device as recited in claim 8, wherein said multijunction negative resistance means is a composite of PNPN avalanche diodes having the second P and N regions common to each diode.

No references cited.

ARTHUR GAUSS, *Primary Examiner.*

B. P. DAVIS, *Assistant Examiner.*